United States Patent [19]

Wolfson et al.

[11] 4,419,734
[45] Dec. 6, 1983

[54] INVENTORY CONTROL SYSTEM

[75] Inventors: William Wolfson, Wayland; Jan W. Grondstra, Acton; Curt Jarva, Hanover, all of Mass.

[73] Assignee: Indata Corporation, W. Concord, Mass.

[21] Appl. No.: 223,749

[22] Filed: Jan. 9, 1981

[51] Int. Cl.³ .......................... G06F 3/05; H04Q 1/22
[52] U.S. Cl. .................... 364/567; 364/403; 364/478; 177/25; 340/825.35
[58] Field of Search .............. 364/403, 567, 900, 478, 364/403; 177/25, 1; 340/825.35

[56] References Cited

U.S. PATENT DOCUMENTS

| 3,142,820 | 7/1964 | Daniels | 364/550 X |
|---|---|---|---|
| 3,340,509 | 9/1967 | Krause | 340/825.35 |
| 3,426,326 | 2/1969 | Goldstein | 340/825.35 |
| 3,605,089 | 9/1971 | Gray | 364/900 |
| 3,863,724 | 2/1975 | Dalia, Jr. | 177/25 |
| 4,034,339 | 7/1977 | Free et al. | 364/900 X |
| 4,108,363 | 8/1978 | Susumu | 177/25 X |
| 4,137,567 | 1/1979 | Grube | 364/567 X |
| 4,157,738 | 6/1979 | Nishiguchi et al. | 177/25 X |
| 4,180,204 | 12/1979 | Koenig et al. | 235/454 X |
| 4,195,347 | 3/1980 | MacMunn et al. | 364/478 |
| 4,206,822 | 6/1980 | Mazzucchelli | 177/25 |
| 4,225,926 | 9/1980 | Wendt | 364/567 X |
| 4,239,434 | 12/1980 | Gannon | 364/567 X |

OTHER PUBLICATIONS

Single-Component Microcomputer Network Provides Data Acquisition Shelf-Monitor System for Special Nuclear Material Real-Time Inventory, C. D. Ethridge et al; IEEE Transactions on Nuclear Science, vol. NS-26, No. 1, Feb. 1979, pp. 672-678.

Primary Examiner—Edward J. Wise
Attorney, Agent, or Firm—Schiller & Pandiscio

[57] ABSTRACT

An inventory control system for a plurality of storage areas is provided wherein each storage area comprises at least one platform adapted to support a plurality of identical articles, and platform-supporting means including transducer means for providing a first electrical signal which varies in accordance with changes in the load carried by the platform-supporting means. The system also includes signal processing means for processing the first signals and producing in response to each first signal a second signal which is representative of the number of articles supported by the corresponding platform, scanning means for causing each of said first signals to be selectively coupled to said signal processing means, and means for providing an inventory record in response to said second signals.

26 Claims, 18 Drawing Figures

INVENTORY CONTROL SYSTEM

BACKGROUND OF THE INVENTION

The present invention relates to the electronic inventorying art and more particularly to improved systems and methods for automatically compiling a record of physical inventory which is adapted for high speed data processing equipment.

It is desirable to provide a system for automatically and constantly maintaining an up-dated record of physical inventory, particularly in inventory control situations where a large stock of numerous items enjoy a rapid turnover.

Various inventory accounting methods are known which employ data processing equipment. In the usual system inventory information is put into a computer which in turn records and processes the information in accordance with predetermined requirements, updates recorded information when new information is supplied to it, and makes the record of current inventory available for instant interrogation and use. Many of these systems are of the telemetry type which employ intercom arrangements such as telephones, inter-active terminals and the like for connecting the inventory storage facilities with the inventory control computer and also with distributed computers and/or terminals. Thus inventory at one or more storage facilities, e.g., warehouses, supermarkets, and distribution centers may be accounted for on site and this data may be transmitted by telephone communication lines or radio transmission to a centrally located computer center and/or multiple interactive terminals located at individual marketing locations. U.S. Pat. Nos. 3,605,089, 4,180,204 and 4,034,339 illustrate different approaches to inventory control.

Most prior inventory accounting methods have shortcomings at the input end. Often inventory is taken manually to start and constant inventory accounting is achieved by accurate accounting of all transactions into and out of stock. However, that type of inventory accounting is slow and expensive and requires meticulous acquisition and handling of inventory data. Often the inventory derived by the constant accounting of transactions into and out of stock is inaccurate because of unaccounted for transactions, spoilage, breakage, pilferage, or improper identification of number or type of goods in stock, or for other reasons. Accordingly, means have been devised for facilitating and rendering more accurate the determination of how many items are present at selected storage sites.

U.S. Pat. No. 3,605,089 discloses an inventory scanning and recording system which comprises a plurality of pressure-responsive transducers upon which items of stock rest. The transducers are read by scanning means and the information read by the scanning means is recorded in a storage unit to create an inventory record. This record is updated with each scanning sequence. This record is constantly available for computer interrogation or for utilization by a reader or for transmittal to selected media such as magnetic tape, disc, or other suitable storage media.

Unfortunately the system disclosed in U.S. Pat. No. 3,605,089 is limited in its suitability for large scale warehouses where a large number of different types of articles are stored in varying amounts. The particular form of transducer system employed in the apparatus of U.S. Pat. No. 3,605,089 does not conveniently accommodate a change in the type of articles to be stored in a particular area, and also does not appear to permit determination of the number of articles in each individual storage area with the accuracy required by currently acceptable accounting practices.

U.S. Pat. No. 3,863,724 discloses another form of inventory control system which employs individual weight sensing means as supports for bottles on a shelf. That system is not readily adaptable to many uses and suffers because of the need for one weight sensor for each article to be counted.

SUMMARY OF THE INVENTION

The present invention avoids or reduces many of the shortcomings of the prior art by providing an arrangement which can rapidly and accurately detect changes in the number of articles located in each of a number of selected storage areas.

The primary object of the invention is to provide an inventory control system which utilizes, at each of a plurality of storage areas, means including load-responsive transducers arranged to detect changes in the total weight presented by the articles stored in each area.

A further object of the invention is to provide a novel physical inventory scanning system which is uniquely adapted for computerized operation, including automatic scanning of each of a plurality of storage areas and automatic recording of the information obtained from each storage area.

A further object is to provide an inventory control system which may be adapted to serve as an anti-theft system.

Still another object of the invention is to provide an inventory control system which employs a unique weighing means and may be arranged for automatic updating without movement or handling of any stored item.

According to the broader aspects of this invention there is provided a system for compiling an inventory record which essentially embodies one or more article supporting storage stations each comprising one or more platforms (the term "platform" is used hereinafter in a generic sense to mean a shelf, floor or the like), and platform-supporting means including load-responsive transducers for providing for each platform a gross weight information signal which varies whenever the number of articles supported by the platform, and hence the total weight supported by the platform, changes. Also included in the system are means for processing the gross weight information signal so as to produce a signal representative of the quantity of articles supported by each platform. Each platform is distinguished by a unique address which is stored in a memory and which is used for the purpose of querying each platform to determine the gross weight of the items at that platform. Additional memory means contain information pertaining to the unit weight of the articles at each platform. The unit weight information is employed to automatically convert the gross weight information signal for each platform to an indication of the number of units stored at that location. In a preferred embodiment of the invention, each platform is a shelf and each shelf is part of a group of shelves associated with a microprocessor which interacts with a central computer so as to accept shelf addresses from the central computer and responds when properly addressed by transmitting back to the central computer an electrical signal containing information about the gross weight of the items stored on each shelf in the group. The central computer uses this gross weight electrical signal from a shelf and the unit weight of items stored on that shelf to provide an indication of the number of units at each shelf. The computer also may be programmed to automatically scan all of the shelves periodically so as to provide a constantly updated real time inventory report.

Other features and many of the attendant advantages of the invention are set forth or rendered obvious by the following detailed description and the accompanying drawings wherein like numbers refer to like parts.

DESCRIPTION OF THE INVENTION

The present invention contemplates that a family of standardized storage stations in the form of platforms, e.g., shelves and/or floors, are provided which utilize built-in weighing and signal transmitting facilities. Transmission and proper utilization of weight signals is implemented by scanning each storage station to access the gross weight signal for that station, looking up the unit weight for each unit stored at the storage station under consideration, and providing by automatic conversion means an output indicative of the number of units stored at that specific storage location. Each platform is affected by the weight of the units which it stores and thus the weight of the platform is included in the gross weight signal. For that reason the determination of the number of articles stored involves adjustment of the gross weight signal to compensate for the weight of the platform. If the platforms do not have the same weight, the gross weight signal is compensated according to the specific weight of the particular platform.

Figure 1:
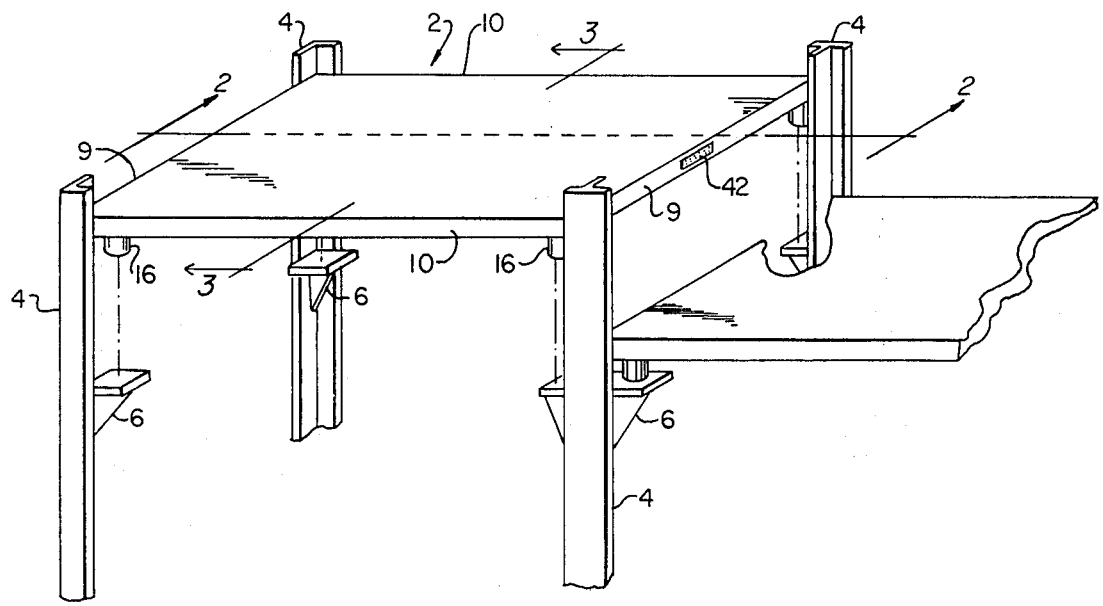
FIG. 1 relates to a preferred embodiment of the invention and is a fragmentary perspective view of two storage stations in the form of shelves.
Figure 2:
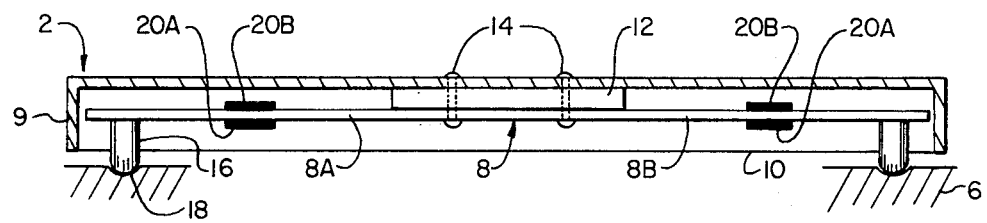
FIGS. 2 and 3 are cross-sectional views taken along lines 2—2 and 3—3 of FIG. 1.

Referring now to FIGS. 1 and 2, there is shown a portion of a multi-station storage facility wherein each storage station is a shelf 2. Each shelf is disposed within an area demarcated by four vertical posts 4. The latter carry support brackets 6 for supporting the shelves at their corners. With respect to each shelf the four brackets supporting it are all located at the same height.

Shelf 2 may take variou forms and preferably but not necessarily it has a skirt defined by side walls 9 and 10. The shelf may be made of any suitable material, e.g., steel, aluminum and/or wood, but in any event it is substantially rigid so as to not deform under its normal loading.

Figure 2A:
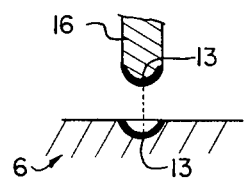
FIG. 2A is an exploded and enlarged view of part of FIG. 2.
Figure 3:
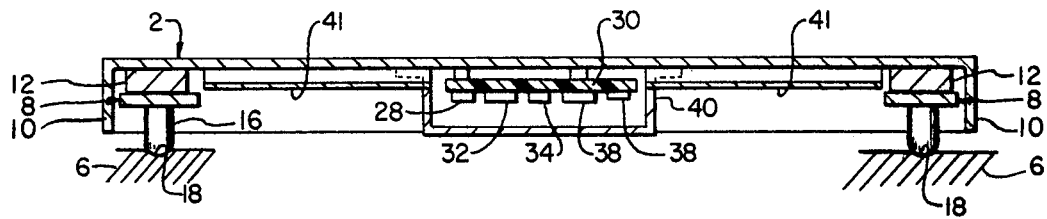

Shelf 2 has two mutually parallel beams 8 attached to its underside. As shown in FIG. 3, beams 8 are located adjacent and extend parallel to the two long sides 10 of the shelf. Each beam is spaced from the shelf by a spacer 12 as shown in FIGS. 2 and 3. The beams and spacers may be secured to each other and the shelf by any suitable means, e.g., by fasteners as shown at 14 or welding. Spacers 12 are shorter than beams 8 and preferably but not necessarily they are centered on the beam so as to cause the beam to comprise two cantilevered sections 8A and 8B of equal length. The free end of each cantilever section 8A and 8B is provided with a depending leg 16. The four legs 16 are located so that each one rests upon and is supported by a different one of the four brackets 6. Preferably the bottom ends of legs 16 are rounded and/or low friction coatings or layers 13 (FIG. 2A) are provided on the brackets 6 and/or the bottom ends of legs 16, whereby to facilitate bending of beam sections 8A and 8B under changing loads. The sides of the shelf are spaced from posts 4 so that the latter will not interfere with vertical movement of the shelves. Lateral movement of the shelves may be prevented in various ways, e.g., by providing rounded dimples 18 in brackets 6 (FIGS. 2 and 2A) to accommodate the rounded lower ends of legs 16. Beams 8 may be made of any suitable material having the property of elasticity, e.g., steel or aluminum, and are made with a cross-section which will allow bending of the cantilever sections 8A and B within selected limits under the load presented by the shelf and the articles supported by the shelf. Preferably beams 8 are made of flat bar stock. By way of example and depending upon the length of sections 8A and B and the expected loading of the shelf and the articles on the shelf, beams 8 may be made of flat aluminum bars having a thickness of ⅜ inch and a width of 2 inches. It is to be understood that each beam may be replaced by two cantilever beams corresponding to beam sections 8A and B (the same result may be accomplished by cutting beam 8 in two places between fasteners 14.

Still referring to FIG. 2, each beam section 8A and 8B is provided with two strain gages represented schematically at 20A and 20B. Strain gages 20A are attached to the lower sides of beam sections 8A and 8B and strain gages 20B are attached to the upper sides of the same beam sections, so that as each beam section bends under a load increase, its strain gage 20B will undergo compression while its strain gage 20A will undergo tension. The tension and compression decreases when the beam section unbends as a consequence of a load decrease. Further details of the strain gages are not presented since strain gages are well known in the art and since they may take various forms. However, foil-type resistance strain gages are preferred since they are relatively inexpensive, are commercially available in various sizes, and in closely matched characteristics, are quite accurate, and can be easily attached to the beams. Preferably each foil-type gage consists of two resistance elements, e.g., so-called dual gages. If desired, two or more pairs of strain gages 20A and 20B may be attached to each beam section 8A and 8B. In any event by suitably coupling the strain gages of all four beam sections 8A and 8B it is possible to obtain a gross weight information signal that varies in accordance with changes in the loading on the shelf.

Figure 4:
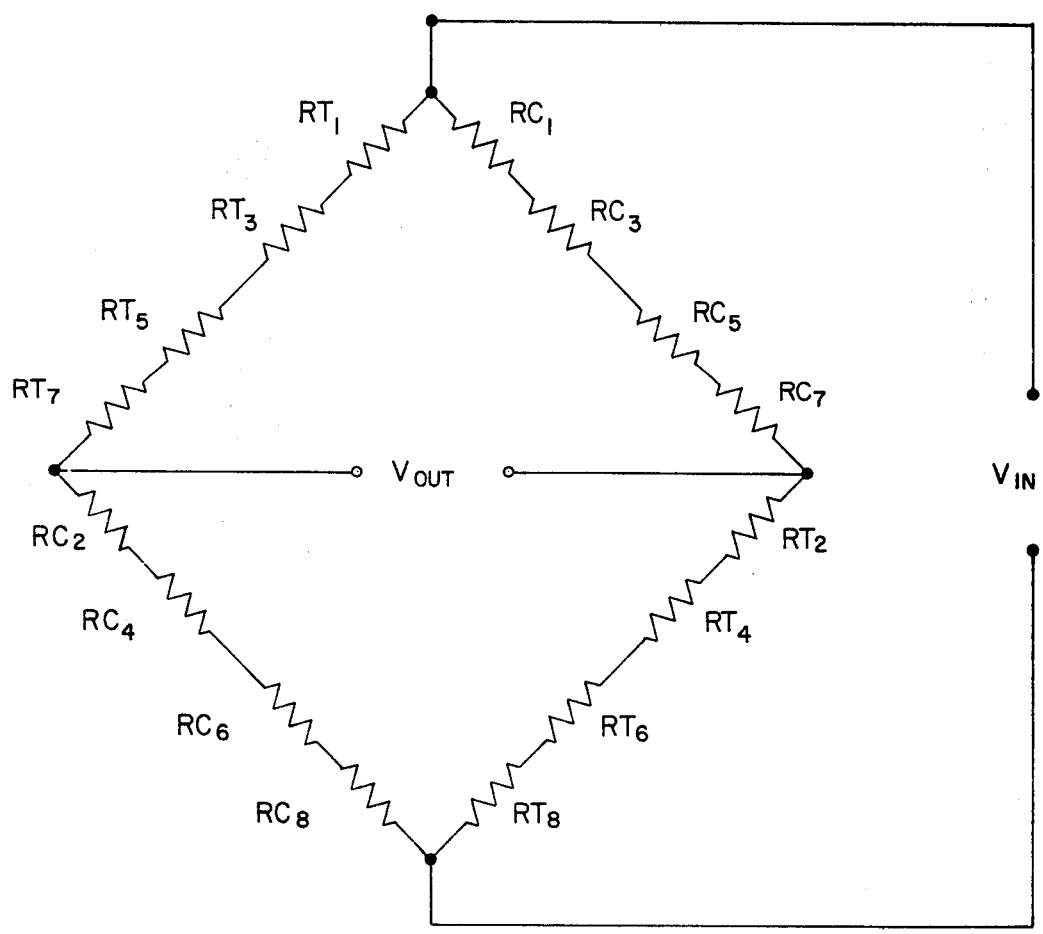
FIG. 4 is a schematic diagram illustrating how strain gauges employed in the shelf-support arrangement of FIGS. 1-3 are connected to provide a gross weight information signal.

FIG. 4 illustrates a bridge arrangement for deriving a gross weight information signal from the dual strain gages 20A and 20B respectively. In FIG. 4 the terms "RT" and "RC" designate tension and compression strain gages 20A and 20B while the subscripts 1 ... 8 denote different gage resistance elements. Thus, the two dual strain gages 20A and 20B carried by beam section 8A in FIG. 2 are represented by resistances $RT_1$, $RT_2$ and $RC_1$, and $RC_2$, respectively, while the corresponding elements of the strain gages carried by beam section 8B are represented as resistances $RT_3$, $RT_4$ and $RC_3$, $RC_4$ respectively. The corresponding elements of the strain gages 20A and 20B carried by beam section 8A of the second beam 8 are represented as resistances $RT_5$, $RT_6$ and $RC_5$, $RC_6$ respectively, while the two corresponding elements of the two gages 20A and 20B carried by the other beam section 8B of the second beam are represented as resistances $RT_7$, $RT_8$ and $RC_7$, $RC_8$ respectively. The gages are connected in a bridge as shown. A stable d.c. voltage source $V_{in}$ is connected across two terminals of the bridge and an analog voltage $V_{out}$ appearing across the other two terminals of the bridge will vary in accordance with changes in resistance in the bridge resulting from changes in the stress on beams 8 caused by changes in the loading on the shelf. This voltage $V_{out}$ is the gross weight information signal including the weight of the shelf itself (tare). As noted hereinafter, the signal $V_{out}$ is applied via an output amplifier 28 (see FIGS. 3 and 9, for example) to a voltage-to-frequency converter or other form of A/D converter.

It is to be appreciated that the elements of the eight strain gages may be connected otherwise than as shown in FIG. 4. One alternative mode of connecting them would be to have elements $RT_1$, $RT_2$, $RT_3$ and $RT_4$ in series in one leg of the bridge and elements $RT_5$, $RT_6$, $RT_7$ and $RT_8$ in series in an opposite leg of the bridge. The RC elements would be disposed in a similar fashion, with elements $RC_{1-4}$ in series in a third leg and elements $RT_{5-8}$ in the fourth leg. In such an arrangement each of the two terminals for application of voltage $V_{in}$ and each of the two terminals for $V_{out}$ would be at a junction of RT elements and RC elements. As a further alternative measure the elements of each pair of oppositely disposed strain gages 20A and 20B could be connected as a bridge where the two tension elements (e.g., $RT_1$ and $RT_2$) would comprise two opposite legs and the two corresponding compression elements (RC, and $RC_1$) would comprise the other two opposite legs. Four such bridges, each supplied with $V_{in}$, would be required and the $V_{out}$ of such four bridges would be summed to get a resultant signal which would be the gross weight information signal. While connecting the eight strain gages so as to form four bridges and interconnecting the four bridges to get the resultant gross weight information signal is satisfactory from a performance standpoint, a system where the elements of the eight strain gages are interconnected into a single bridge is preferred since it requires less wiring at each shelf.

Referring to FIG. 3, mounted to the underside of each shelf is a circuit board 30 on which is mounted an output amplifier 28, a voltage to frequency converter 32, a counter 34, and one or more other electronic components 38 which make up the portion of the electronic system located at each shelf (the number and type of such components varying according to alternative embodiments of the invention). Preferably circuit board 30 and the associated electronic components are concealed and protected by a cover 40 releasably attached to the shelf. Additional covers 41 protect the wire leads (not shown) which run from the various strain gages to circuit board 30. Additional covers (not shown) may be provided to conceal and protect those portions of the beam carrying the strain gages. The shelves are provided with multi-pin electrical connectors 42 (FIG. 1) which are connected to circuit boards 30. Connectors 42 are adapted to receive plugs on cables which couple the electronic components on the circuit board 30 to a common system bus as hereafter described.

Figure 5:
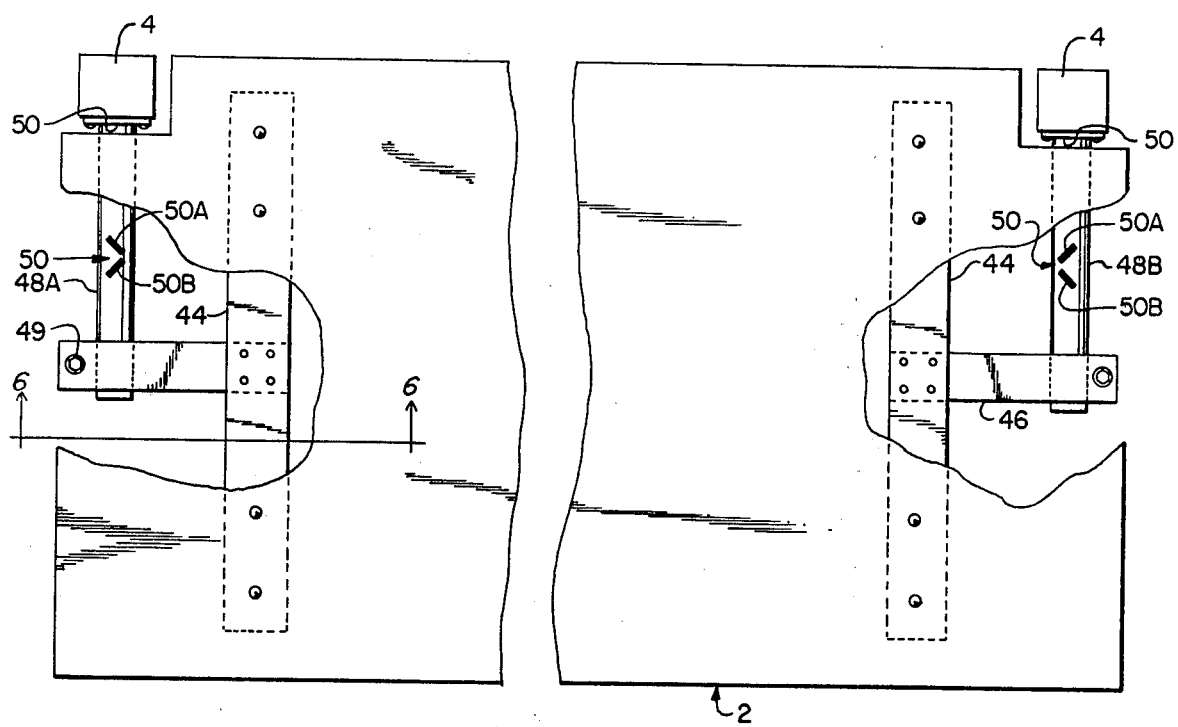
FIG. 5 is a plan view with certain portions broken away, of an alternative way of supporting a shelf according to this invention.
Figure 6:
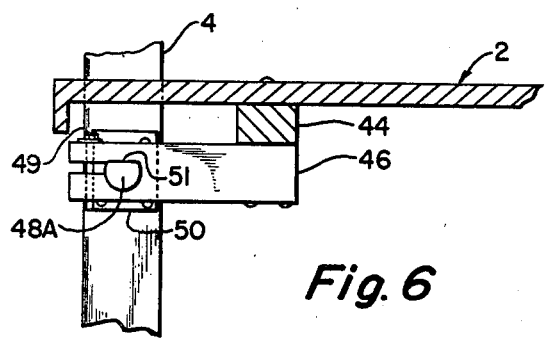
FIG. 6 is a sectional view in elevation taken along line 6—6 of FIG. 5.

FIGS. 5 and 6 show an alternative mode of supporting a shelf wherein strain gages are arranged to sense torsion rather than bending. In this case each shelf 2 is attached to two rigid struts 44 and each of the latter is affixed to one end of a separate lever arm 46. The other ends of lever arms 46 are split so as to form yokes 47 which surround one end of like shafts 48A and B. Yokes 47 are clamped to shafts 48 by screws 49. The two shafts 48A and 48B are mounted cantilever fashion to brackets 50 affixed to two posts 4. The outer ends of shafts 48A and B are formed with flats 51 and one of the two arms of each yoke 47 has a flat surface that engages the corresponding flat 51, so that both lever arms 46 are prevented from rotating relative to shafts 48A and B.

Still referring to FIGS. 5 and 6, each shaft 48A and 48B carries two dual strain gages 50, only one of which is shown. One dual strain gage is mounted on each shaft at a suitable location, e.g., midway between bracket 50 and lever arm 46, with the two elements 50A and 50B of that gage located close together and extending at an angle of 90° relative to the lengthwise axis of the shaft. The second (non-illustrated) dual gage on each shaft is displaced 180° from the first dual gage with its two elements disposed in the same angular relationship to the shaft axis and also to one another as the elements 50A and B of the first dual gage. As is well known in the art, orienting the elements of the two pairs of strain gages on shafts 48A and 48B as above described provides maximum gage sensitivity to torsion while minimizing bending strains.

Figure 7:
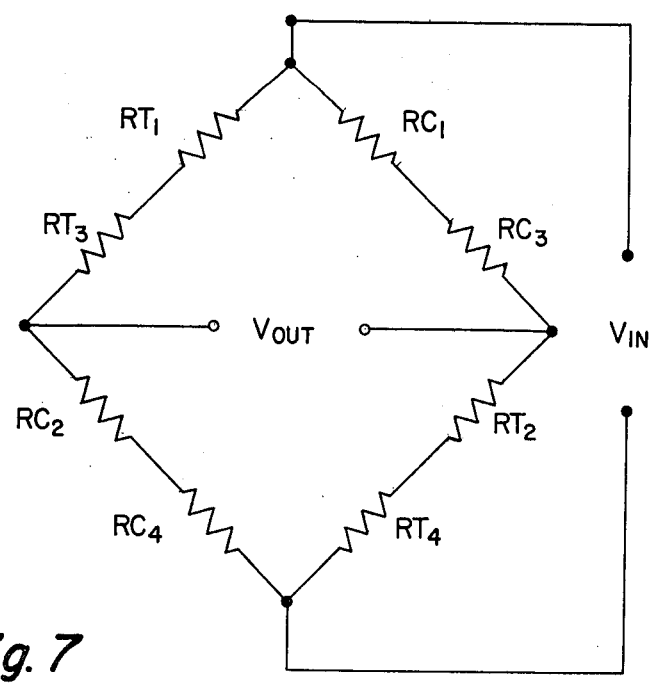
FIG. 7 is a schematic diagram showing how strain gauges employed in the shelf support arrangement of FIGS. 5 and 6 are connected to provide a gross weight information signal.

FIG. 7 illustrates how the two pairs of dual strain gages carried by shafts 48A and 48B may be interconnected to provide a gross weight information signal. In this connection it is to be appreciated that when a shaft 48A or 48B undergoes a change in torsional loading, as will occur when articles are added to or removed from shelf 2, one of the elements 50A of one strain gage on the shaft will undergo a change in tension while the other element of the same strain gage will undergo a change in compression. In FIG. 7, the elements 50A and 50B of the two strain gages shown in FIG. 5 on shafts 48A and 48B are identified as $RT_1$, $RC_1$ and $RT_2$, $RC_2$ respectively. The elements of the second strain gages on shafts 48A and 48B are identified as $RT_3$, $RC_3$ and $RT_4$, $RC_4$ respectively. These elements are connected together in a bridge which has two terminals connected to a stable D.C. voltage $V_{in}$. The voltage $V_{out}$ appearing across the other two terminals of the bridge is the gross weight information signal and will vary in accordance with changes in resistance in the bridge resulting from changes in the loading on the shelf.

Figure 8:
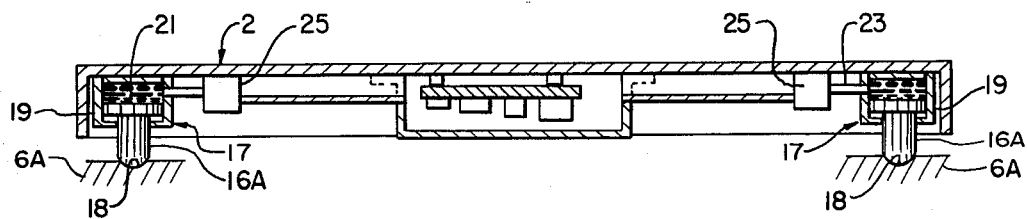
FIG. 8 is a sectional view similar to FIG. 2 ilustrating a third way of supporting a shelf using fluidic supports and pressure transducers as the load sensing transducer.
Figure 9:
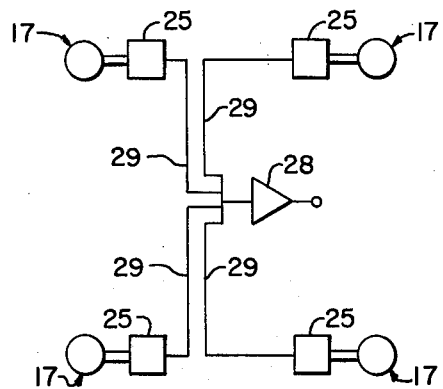
FIG. 9 is a schematic diagram illustrating how the fluidic supports and pressure transducers of the shelf support arrangement of FIG. 8 are connected to provide a gross weight information signal.

Referring now to FIGS. 8 and 9, there is shown a portion of a multi-station storage facility wherein each storage station is a shelf 2 adapted to be supported on four brackets 6A like the brackets 6 shown in FIG. 1. Four piston units 17 are attached to the underside of each shelf at its four corners. Each piston unit comprises a cylinder 19 closed at its top end and having an end wall with an opening at its bottom end, plus a piston 21 movably disposed within the cylinder and having an extension in the form of a rod 16A which extends through the hole in the bottom end wall of the cylinder. Rods 16A seat on support brackets 6A. Although not shown it is to be understood that the bottom end wall of each cylinder is provided with an hermetic seal that allows the piston to reciprocate without any leakage of fluid from within the cylinder. Each cylinder has a side port which is coupled by a conduit 23 to a pressure transducer 25. All of the cylinders are filled with a hydraulic fluid 27 to the same initial no-load pressure. Although not shown, each cylinder may have a side port fitted with a valve to permit it to be filled with hydraulic fluid to a suitable pressure.

Pressure transducers 25 may take various forms without departing from the principles of this invention. Thus, for example, transducer 25 may be of the type using a strain gage or of the type involving a capacitor where one of the plates of the capacitor is a pressure-responsive diaphragm. In any event transducers 25 produce d.c. electrical analog signals varying in accordance with the pressure in the associated piston unit 17, which pressure will vary with the proportion of the shelf loading carried by the piston unit. Still referring to FIGS. 8 and 9, it is to be understood that for shelf 2 the pressure of the fluid in the piston units 17 and the weight of the shelf and whatever articles are on the shelf, determine the level of the shelf with respect to brackets 6, and if the loading on the shelf changes, the pressures sensed by transducers 25 also will change. As seen in FIG. 9, the output signal lines of the four pressure transducers 25 are connected together in a summing arrangement so as to provide a single input signal to output amplifier 28. The output signal of amplifier 28 is applied to a voltage to frequency converter or other form of A/D converter.

Figure 10:
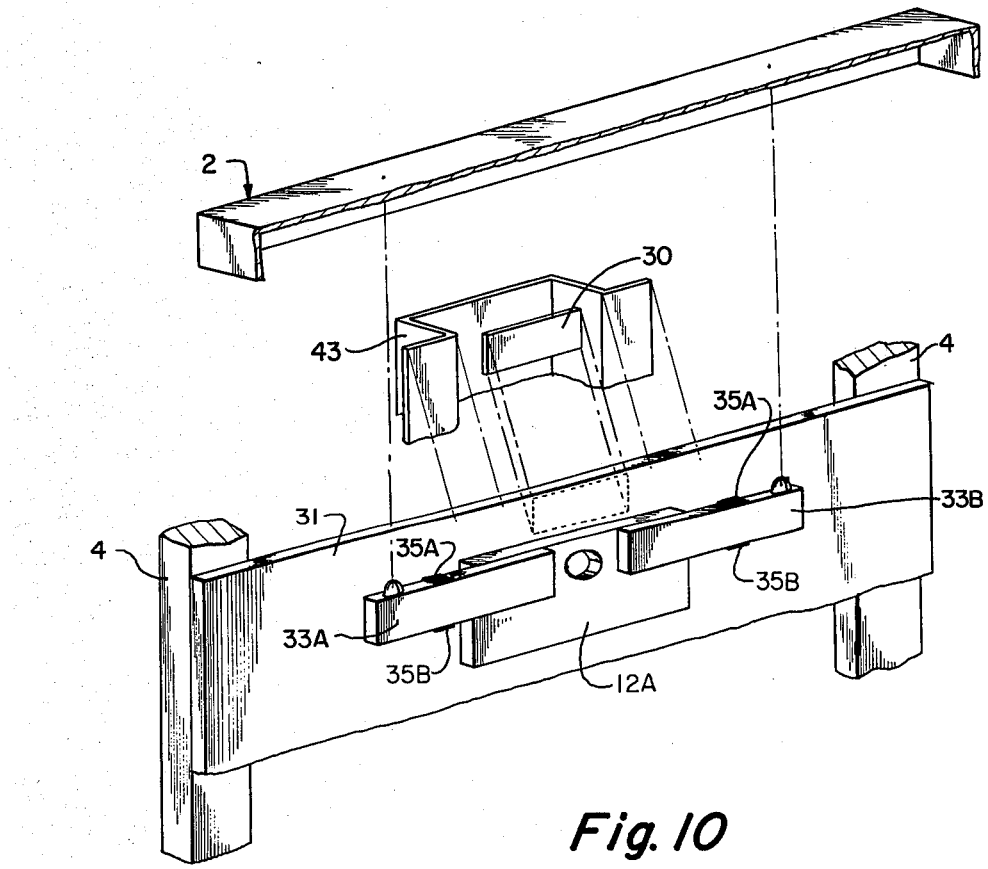
FIG. 10 is an exploded perspective view of a fourth way of supporting a shelf according to this invention.
Figure 12:
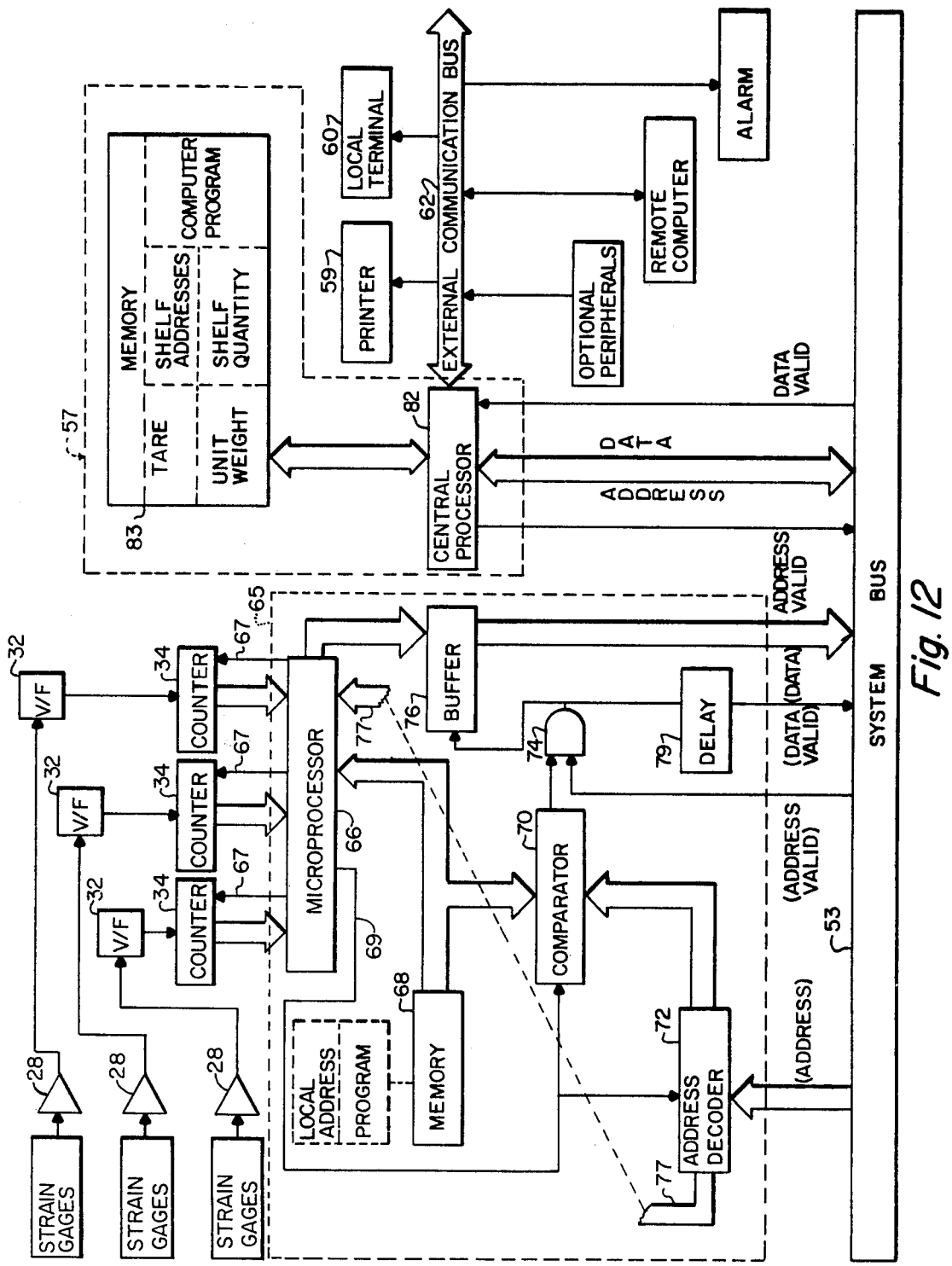
FIG. 12 is a more detailed schematic design of a preferred embodiment of our invention using one microprocessor for several shelves.

FIG. 10 shows one half of another arrangement for supporting platforms according to this invention. In this case a cross-member 31 connects two corner posts 4. Affixed to the inner side of member 31 is a spacer member 12A to which two mutually aligned beams 33A and 33B are secured in cantilever fashion. Each beam has a dual strain gage 35A attached to its upper side and a like strain gage 35B attached to its lower side. Projections 37 at the free end of each beam support shelf 2 and keep it from contacting the gages 35A. A hole 39 is provided in cross-member 31 to permit wire leads to be brought from the four dual strain gages to the printed circuit board 30 which is mounted on the outer side of cross-member 31. A channel shaped cross-member 43 is releasably secured to the outer side of member 31 in covering relation to circuit board 30 and wire leads running from the circuit board to other portions of the inventory contact system. It is to be understood that a similar dual beam arrangement is used to support the other end of the shelf, with the result that the shelf is supported at its four corners. The four pairs of dual strain gages 35A and 35B may be connected in the same manner as the strain gages of the system of FIGS. 1-4, with the signal $V_{out}$ constituting the gross weight information signal being applied to an output amplifier 28 carried by one of the circuit boards 30. The amplified signal is then applied to a suitable A/D converter, e.g., one employing a voltage to frequency converter as shown in FIG. 12.

Figure 11:
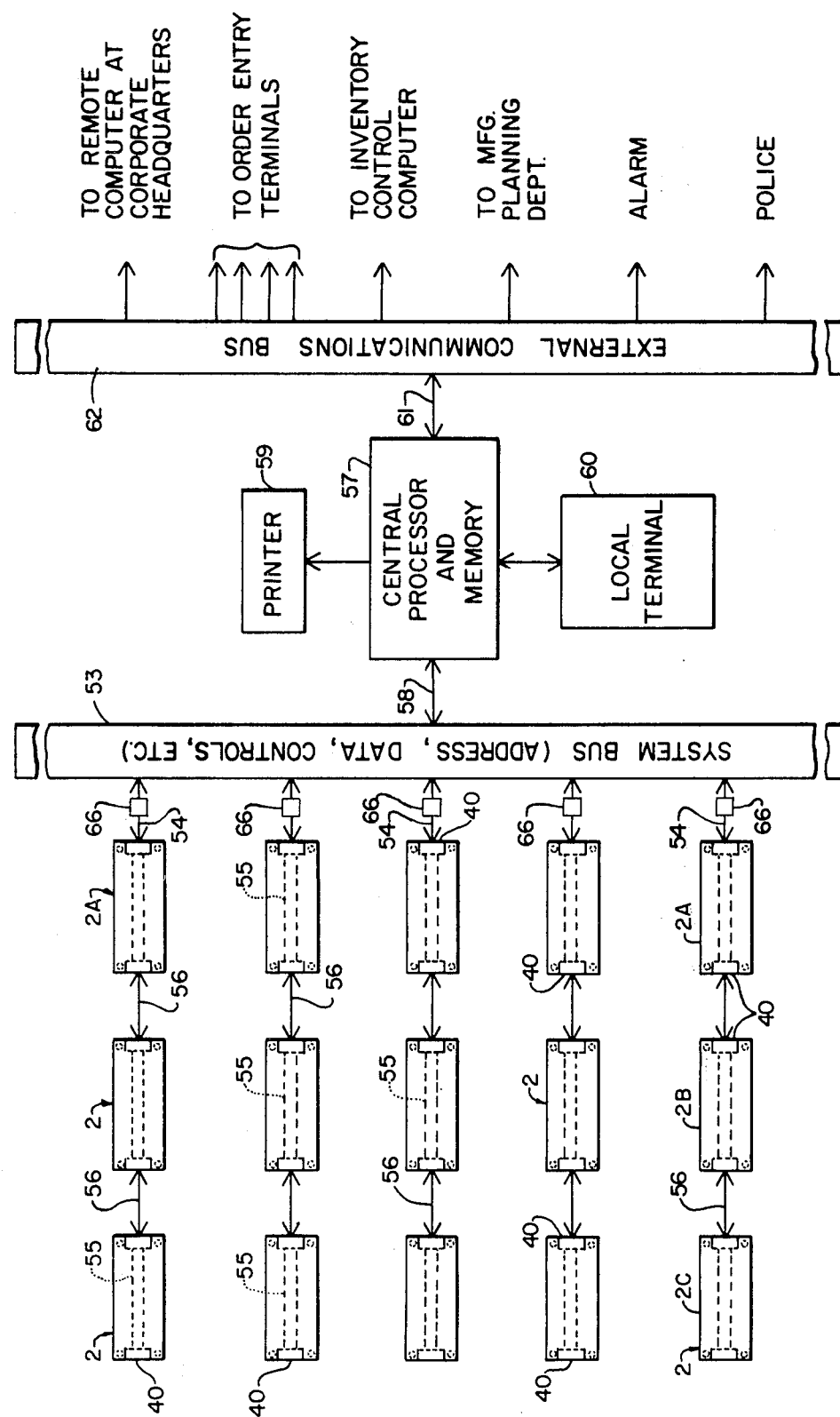
FIG. 11 schematically illustrates the general form of our inventory control system using a central computer to monitor a multi-shelf storage facility.

FIG. 11 schematically illustrates the general form of an inventory control system according to this invention using a central computer to monitor a storage facility comprising a plurality of shelves arranged according to one of the ways described above. The connectors 42 for the circuits of the several shelves are connected by cables and microcomputers 65 to a common system bus 53. The connectors and cables may be arranged so that each shelf is connected directly to systems bus 53 by a separate cable 54 and microcomputer 65, as in the case for shelves 2A. Preferably, however, each shelf has two connectors 42 (e.g., one at each end) connected with its circuit board 30 in parallel with each other, and a subsystem bus represented schematically at 55 which runs between the two connectors, whereby several shelves may be connected to a common microcomputer 65 and system bus 53 either directly by several cables 54, or indirectly by a cable 54 plus cables 56 extending from the connector 42 of one shelf to the connector 42 of another shelf, as in the case for shelves 2B and 2C. This arrangement facilitates connection of adjacent shelves (either side by side on one above the other), reduces the amount of wiring involved, permits shelves to be added to or removed from the inventory control system with a minimum of difficulty, and allows one microcomputer to collect weight data from one or more shelves and to answer all queries the central processor directed to any shelf on the sub-system bus 55 to which the microcomputer is connected. Each microcomputer 65 may be carried by one of the shelves 2 under its control (e.g., mounted on one of the circuit boards 30) or it may be separate from such shelves. Thus, for example, each microcomputer may be mounted on a printed circuit board attached to a member such as cross-member 31 (of FIG. 10) which forms part of the shelf-support framework.

Still referring to FIG. 11, preferably system bus 53, subsystem buses 55 and connecting cables 54 and 56 each comprises a plurality of electrical lines and functions to transmit all weight data, addresses and control signals between the individual shelves, microcomputers 65, and a central inventory scanning and accounting means in the form of a central computer 57 via a connecting cable or bus 58. However, it is to be understood that separate busses may be used for weight data, address and control signals.

Each shelf is assigned a unique local address corresponding to a specific address in the central computer's memory and the central computer is adapted to (a) query each shelf for its gross weight by means of its local address and (b) automatically convert the gross weight data by means of table lookup of tare and unit weight to provide a response in the form of the number of units on the shelf. The central computer may include a printer 59 and/or CRT terminal 60 and is coupled by a connecting cable or bus 61 to an external communications bus 62 so as to be able to communicate with remote or local computers or terminals for various purposes as shown, e.g., to permit a clerk to check inventory before accepting on the telephone an order requiring quick delivery, to allow a controller, purchasing agent, auditor, production planner, or other corporate officer or agent to monitor or audit inventory, or to send an alarm to police or security personnel in the event of an unexpected reduction in inventory. As is believed obvious to persons skilled in the art, central computer 57 may automatically interrogate the various shelves in a predetermined order or in a random fashion. As an alternative measure, user access may be by a conventional priority interrupt introduced via external communications bus 62.

FIG. 12 schematically illustrates a preferred embodiment of the system of FIG. 11. This scheme utilizes soft-wired logic at each storage station to achieve inventory scanning and reporting. In this particular case each station comprises three shelves and a microcomputer 65 which is connected between common system bus 53 and the three shelves. The three shelves have beams and strain gages according to the arrangement shown in FIGS. 1–4, and are mounted one above the other on a common shelf support unit made up of four posts 4 and three vertically spaced sets of brackets 6. Microcomputer 65 is carried by a circuit board mounted to the common shelf support unit and is made up of a number of electronic modules in the form of a microprocessor 66, a memory 68, a comparator 70, an address decoder 72, and AND gate 74, a gated output buffer 76 and a delay 79. Memory 68 contains the unique local addresses of the three shelves controlled by the particular microcomputer 65, plus the program for operating microprocessor 66. Shelf addresses transmitted over system bus 53 are applied to decoder 72. Another bus 77 transmits decoded shelf addresses to microprocessor 66. A line 69 applies enable signals from microprocessor 66 to decoder 72 and comparator 70. Microcomputer 66 is coupled to the three shelves by means of three analog-to-digital (A/D) converters, each of which comprises an output amplifier 28, a voltage-to-frequency (V/F) converter 32, and a counter 34. The analog gross weight information signal output $V_{out}$ of the strain gages of each shelf is applied to a different amplifier 28. The converters 32 convert the analog signals to pulses varying at a frequency proportional to the amplitude of the analog signals. By way of example, the V/F converter 32 may be of the type sold by Analog Devices as part No. AD537. The counters 34 convert the gross weight information signal outputs of converters 32 into an output having a parallel bit format. The counters 34 have a latched output which is reset periodically by clock signals generated by microprocessor 66 and applied via a line 67. The parallel bit gross weight outputs of the three counters 34 are applied to microprocessor 66, where they are stored in memory for subsequent retrieval and delivery to buffer 76 when the correct shelf address appears on bus 77. Gated buffer 76 may be of any suitable form, typically a plurality of gated amplifiers, one for each of the parallel bit signals making up the gross weight data.

AND gate 74 has one input line connected to the output line of comparator 70 and another input line connected to a line in system bus 53 on which is carried an "Address Valid" clock signal generated by central computer 57. The output line of AND gate 74 is connected to the Enable terminal of buffer 76 and also to a delay 79. The output of delay 79, identified as the "Data Valid" clock signal, is applied to computer 57 via a line in system bus 53. Central computer 57 comprises a central processor 82 and a memory 83 which contains (1) lookup tables for (a) the tare of each shelf, and (b) the unit weight of the units stored on each shelf, (2) the specific addresses for each shelf corresponding to the memory addresses for the tare and unit weights, and (3) the program for operating central processor 53 so as to effect a determination of the number of units stored on each shelf automatically or on command.

Figure 13:
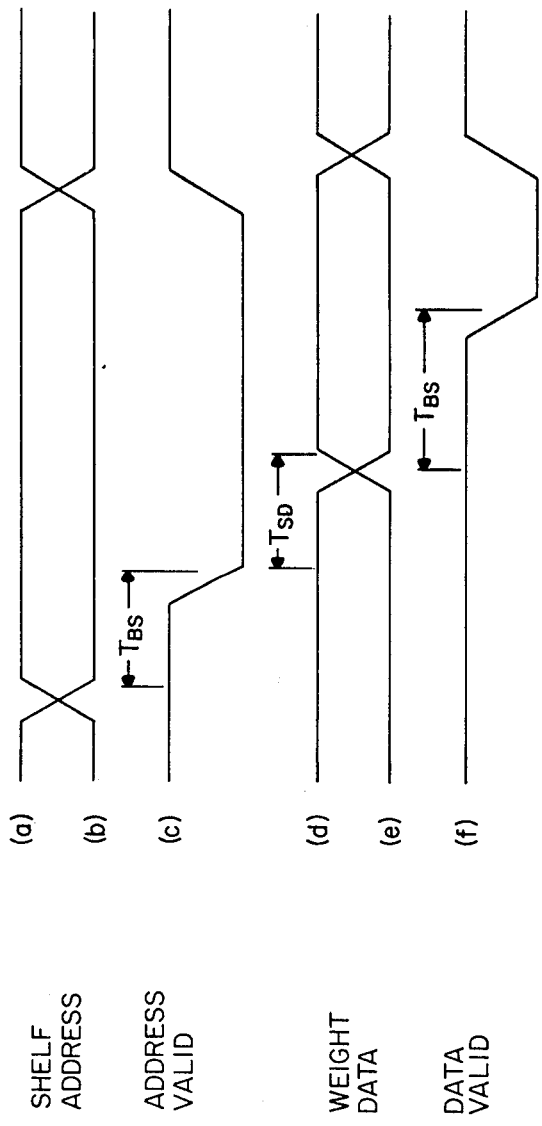
FIG. 13 is a timing diagram for the system of FIG. 12.

FIG. 13 is a diagram of the timing of the shelf address, weight data, Address Valid and Data Valid signals appearing on system bus 53. In this instance the binary bits constituting the shelf address and the weight data are transmitted as parallel signals and hence the envelopes formed by waveforms (a) and (b) represent the plurality of parallel signals constituting shelf address, while the envelopes represented by waveforms (d) and (e) represent the several parallel signals constituting the weight data. Computer 57 generates the Address Valid signal represented by waveform (c) after a delay $T_{BS}$ equal to the time required for the address (or data) signal levels to settle down on bus 53 and the response time of decoder 72 and comparator 70. The weight data signals from a shelf that has been addressed appear on bus 53 after a delay $T_{SD}$ constituting the response time of the shelf logic (comparator 70, gate 74 and buffer 78). The delay 79 is set so that the Data Valid signal is applied to the bus 53 after the weight data signals. The Data Valid signal represented by waveform (f) appears on the bus 53 following the beginning of the weight data transmission period after a delay $T_{BS}$ (which is the time required for the signl levels to settle down on bus 53).

Referring again to FIG. 12, microprocessor 66 provides a control signal on line 69 to enable comparator 70 and address decoder 72 only if the gross weight data output of microprocessor 66 meets a predetermined uniformity standard. Accordingly, when an address is transmitted over bus 53, comparator 70, if enabled, will compare that address with the unique local shelf address in memory 68. If the address sensed by decoder 72 in the correct one, the input line of AND gate 74 connected to comparator 70 will go low. The Address Valid signal also will go low. As a consequence of both of its inputs being low, AND gate 74 will have its output go low, thus enabling buffer 76 so that the latter will transmit the weight data output from microprocessor 66 to system bus 53. The Data Valid signal also is applied to bus 53 according to the timing shown in FIG. 13. The central computer 57 receives the data and processes it after allowing for the signal level settling time $T_{BS}$ determined by the timing of the Data Valid signal. The central computer responds to the data by determining from the look-up tables in its memory the tare and unit weight values for the shelf from which the data was received, subtracting the tare value from the gross weight value represented by the data so as to get a net weight value, and dividing the net weight value by the unit weight to determine the number of units stored on the shelf. This quantity is then stored in memory for subsequent use and also may be transmitted to local CRT terminal 60 for display or to printer 59 to make a hard copy record, or via external communications bus 62 to other equipment, e.g., a remote inventory control computer or to a computer at a corporate headquarters or in a manufacturing planning department.

Although FIG. 12 shows one microcomputer 65 controlling a single group of three shelves, it is obvious that the number of shelves in a group controlled by each microcomputer 65 can be varied greatly. Thus, a separate microcomputer 65 may be provided for each shelf, in which case it is preferred that each microcomputer be attached directly to its shelf, preferably on circuit board 30. The number of groups of shelves each controlled by its own microcomputer also may be varied greatly. The interrogation of shelves by the transmittal of addresses by computer 57 may be accomplished automatically by appropriately programming the computer, or on command. The interrogation of shelves may be continuous or periodical, and may be suspended by a priority interrupt calling for the interrogation of only selected shelves or groups of shelves.

Figure 14:
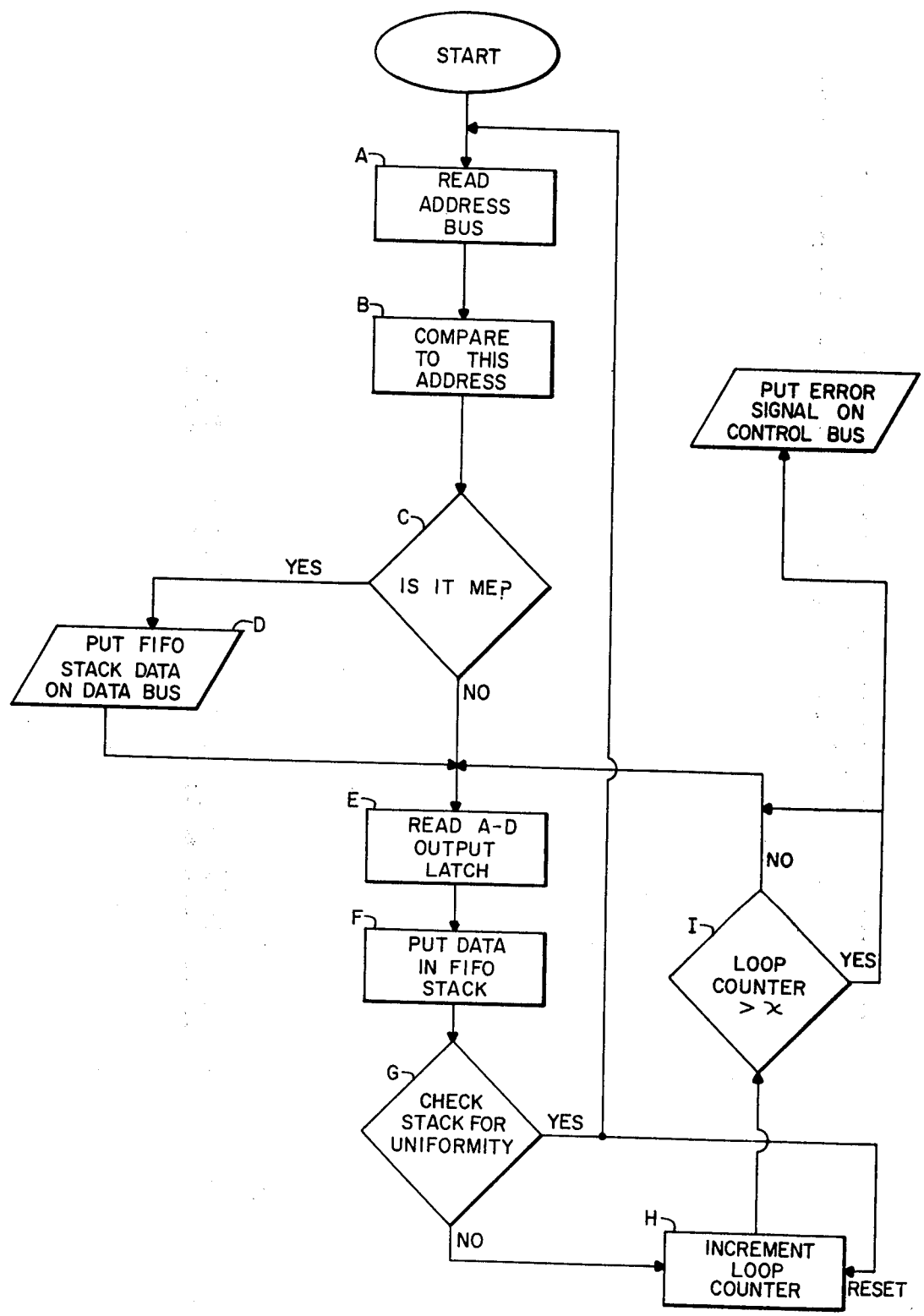
FIGS. 14 and 15 are logic flow charts that illustrate the sequential operation of the system of FIG. 12.
Figure 15:
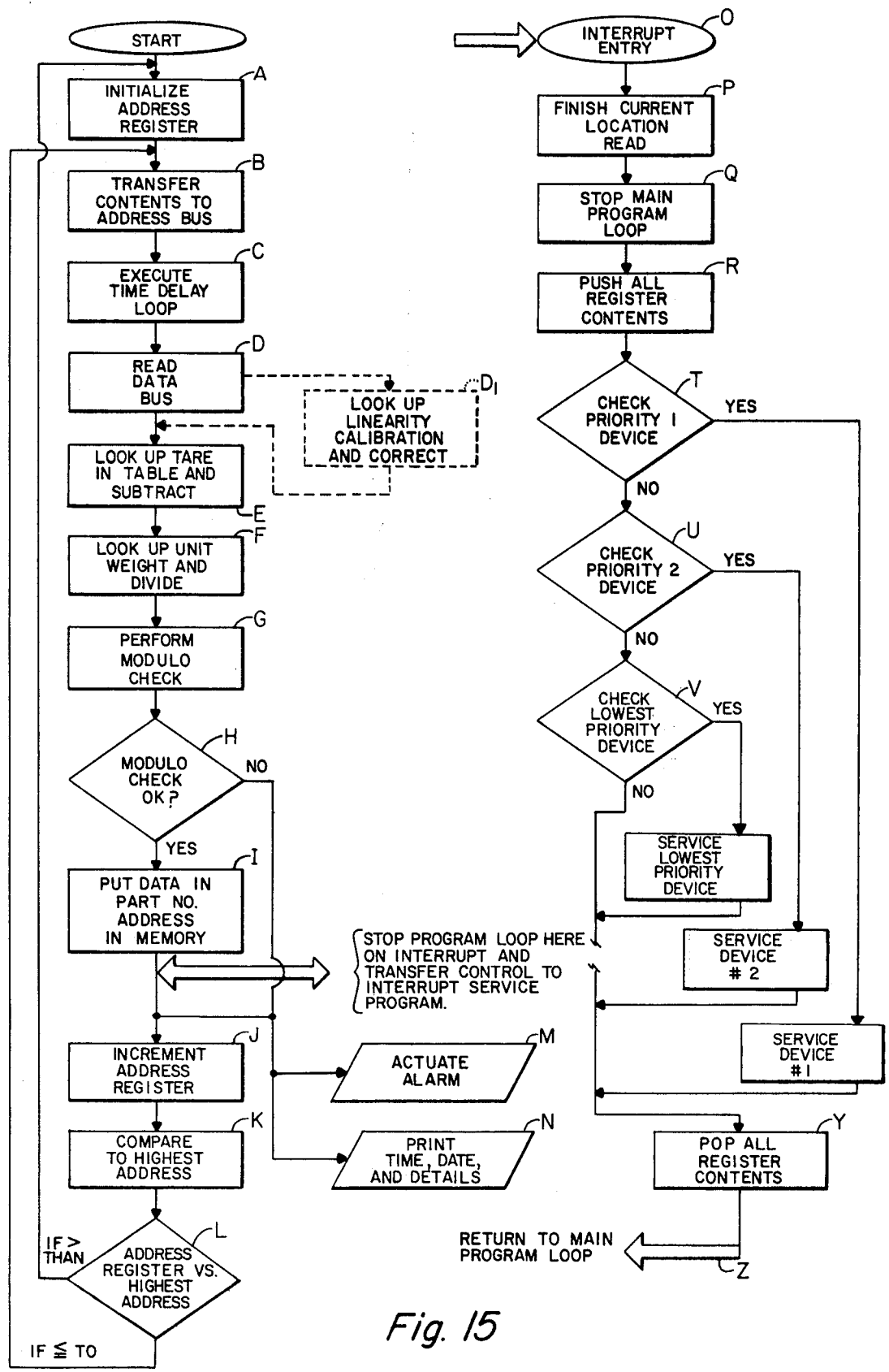

FIGS. 14 and 15 are flow charts illustrating programs for preferred modes of controlling operation of the shelf-related microcomputers 65 and the central computer 57 of the system of FIG. 12. In order to improve accounting accuracy, each microcomputer is controlled so as to ascertain whether the output from each associated V/F converter 32 meets a predetermined standard of uniformity. Only if that standard is met will the microprocessor pass gross weight data from that converter to buffer 76.

FIG. 14 is a flow chart illustrating how microcomputer 65 is programmed. According to this preferred embodiment of the invention, the counters 34 are reset by microprocessor 66 at a frequency substantially higher than the frequency at which each of the shelves 2 is addressed. Also the output of each counter 34 following reset is fed by microprocessor 66 to a FIFO stack memory, i.e., a memory where the first in a series of data inputs is the first to be retrieved. The FIFO stack memory may be part of memory 68 or a different memory. The FIFO stack memory may be of any suitable capacity, but preferably it is designed to store at least 10 successive gross weight readings from a counter 34. Still referring to FIG. 14, each shelf microprocessor 66 is programmed so that as shown at A and B, when the power to the microprocessor is turned on, it will enable decoder 72 to read whatever address code is on bus 53, and also will enable comparator 70 to compare the output of decoder 72 with the address in memory 68. Then as shown at C and D, if address identity is found, the first-in weight data in the FIFO stack memory is applied by buffer 76 to bus 53. If the address read by decoder 72 is not the same as the unique address in memory 68, no weight data is transferred from the FIFO stack memory to buffer 76. However, as shown at E and F, whether or not address identity is found by comparator 70, microprocessor 66 will reset the output latch of the counters 34 so as to cause a new reading of the gross weight output of converter 32 to be applied by the micro-processor to the FIFO stack memory. As shown at G, the microprocessor then checks the contents of the FIFO stack memory for uniformity. In this case uniformity means that the stack memory must be full and all of the gross weight readings in the stack must be identical. If uniformity is not found, the microprocessor indexes an increment loop counter as shown at H. This increment loop counter may be part of microprocessor 66 or a separate unit operatively coupled to the microprocessor. If uniformity is found, the microprocessor causes the increment loop counter to be reset to zero. At the same time the microprocessor again enables decoder 72 to read whatever address may be on bus 53 and also again enables comparator 70 to compare addresses and provide an enabling input to AND gate 74 if address identity is found. As shown at I, each time the increment loop counter is incremented, a determination is made as to whether the count in the loop counter exceeds a predetermined value x, where x is a suitable integer, e.g., 20, selected according to how long a time non-uniformity could be due to mechanical vibrations in the storage area, transients in electronic signals, transient disturbances in electric power, etc. If the count exceeds the predetermined value x, an error signal is transmitted back to the computer via a selected control line in bus 53, or as status information in a message. This error signal may be used by the computer for various purposes, e.g., to sound an alarm or to cause an error flag such as an asterisk to appear next to whatever output record for that interrogated shelf is produced by the computer. Whether or not the count of the loop counter exceeds the predetermined value x, the microprocessor follows the comparison shown at I by again causing the latched output of the particular counter 34 to be reset, so that a new gross weight reading is fed to the FIFO stack.

FIG. 15 is a flow diagram illustrating a program for operating central computer 57. As shown at A and B in FIG. 15 when the computer is started up the program sets the shelf address register in memory 83 of the computer to the lowest address and then the lowest address code in that register is transferred to the address lines of system bus 53. The computer then executes a time delay loop as shown at C in order to permit the logic at the addressed shelf to read out the gross weight data from microcomputer 65 and transfer it to the system 53. Then as indicated at D, at the end of that time delay the gross weight data is read from the system bus 53 by the central processor 82. As indicated at D1 if the transducer output is non-linear, the computer next refers to a calibration look-up table for a suitable correction factor and adjusts the gross weight data in accordance with such factor. After Step D (or D-1, if the latter is required), the computer preforms two computations as shown at E and F. First it looks up the Tare for the addressed shelf in a look-up table provided in memory 83, and subtracts it from the value of the gross weight data so as to provide a net weight value for the articles on the addressed shelf. Then the computer looks up the unit weight in another look-up table in memory 83, and divides that unit weight into the new weight value to give a quantity value. Then as shown at G and H the computer executes a modulo check. In this connection it is to be noted that although it is the requirement of the system that all of the units on a shelf be identical, in practice the weight of apparently identical articles may vary somewhat because of manufacturing tolerances. Thus, the net weight value may not be an exact multiple of the unit weight of the particular article being inventoried but instead may have a net weight value which is somewhat larger or less than an exact multiple by a small amount. Depending upon the accuracy requirements of a particular installation, the modulo check may be programmed so as to accept a quantity value only if it is an exact multiple of unit weight or differs from an exact multiple by less than a selected amount, e.g., less than plus or minus 5 percent.

Still referring to FIG. 15, if the computer determines by the modulo check that the quantity value is within the allowable deviation limit, then as shown at I the quantity value is stored in the computer memory according to the part number assigned to the units being inventoried or, as an alternative, according to the address of the particular shelf. Subsequently as shown at J and K the computer increments its shelf address register to the next higher address and then compares this next higher address with the highest address provided for in that register. As shown at L, if this next higher address is greater than the highest address in the address register, the computer is caused to immediately reset the address register to zero, so as to start the scanning operation all over again. On the other hand, if this next higher address is equal to or less than the highest address provided for in the address register, the computer is caused to execute a loop bypassing the initializing step represented at A, whereby that particular address is transferred from the address register to the address bus and steps B through L are repeated. In this way the computer will repetitively scan all of the shelves in sequence. In this connection it is to be remembered that, as shown in FIG. 12, the Address Valid signal is generated by central processor 82 each time an address is transferred from the main address register to the system bus 53, and each Address Valid signal is received by each AND gate 74 of each group of shelves. Thus, each time an Address Valid signal is transmitted by the central computer, whether or not gross weight data is transmitted from a buffer 76 will depend on whether or not the unique shelf code for the corresponding shelf is received by its decoder 72 in synchronism with the Address Valid signal.

Returning to the flow diagram of FIG. 15, if a negative determination results for the modulo check, the central computer is programmed to actuate an alarm as shown at M and/or actuate a printer to provide a record of time, date, and other identifying data as an indicating that a negative modulo determination was made for a particular shelf. Also, because a negative modulo check determination has occurred, the computer does not put the incorrect quantity value into the computer memory. Instead step I is bypassed and the address register is incremented as shown at J so as to continue the scanning program. The avoidance of the step shown at I in the event of a negative modulo check is for the purpose of avoiding erroneous updating of the inventory record in memory 83.

Still referring to FIG. 15, the operating program for central computer 57 is provided with an interrupt routine. On entry of an interrupt command as shown at O, which command may be entered by the local terminal 60 or by some other terminal connected to external communications bus 62, the computer is allowed to finish reading and processing the gross weight data from a shelf which has just been addressed, and then stops executing its main program loop, as represented at P and Q. The interrupt command stops the main program loop after step I is executed. Thereafter, as shown at R, all temporary registers of the main computer are pushed (i.e., the contents of those registers are transferred to another memory section for storage until the computer returns to the main program loop).

This central computer is adapted to accommodate interrupt commands from different external sources, which may have different priorities. Accordingly, as shown at T, U and V the interrupt routine includes subroutines to check the sources of interrupt commands to determine their priority. The number of priority interrupt devices may vary. In FIG. 15 the interrupt routine is illustrated on the basis of three priority devices. If the source of the interrupt command is the highest priority device, that device is serviced first. The other priority devices are serviced in the order of their priority. The inventory values determined by the computer in accordance with an interrupt command is transmitted back to the interrupting priority device via external communications bus 62.

Following servicing of the priority devices as shown at X1, X2 and X3, the computer is commanded as shown at Y to restore to its operating register the contents which were put into temporary storage according to step R. Once the operating registers have been properly restored, the interrupt routine terminates and as shown at Z the computer program returns to the main loop so as to again increment the address register according to step J.

Figure 16:
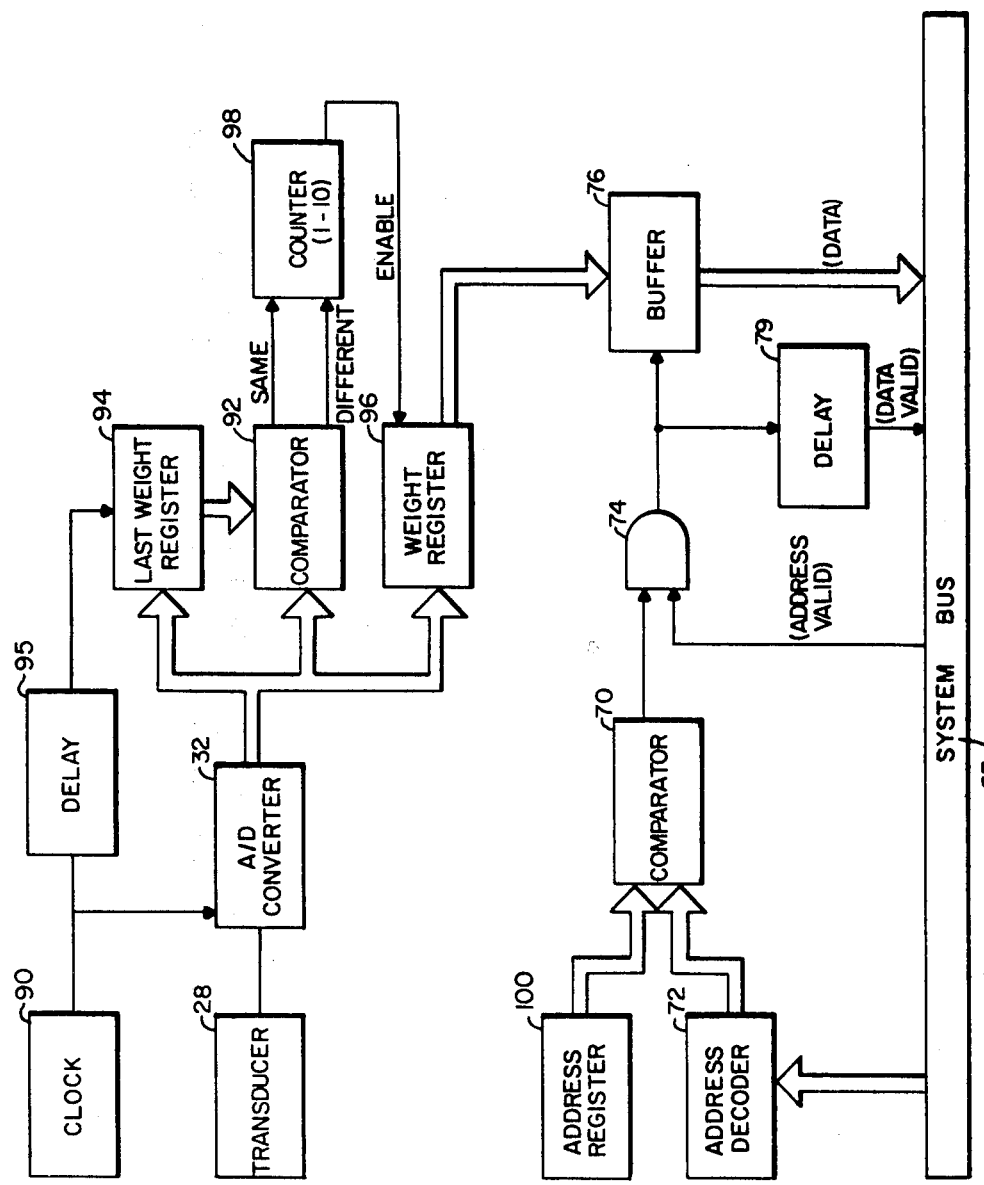
FIG. 16 is a block diagram of an alternative embodiment using hard-wired logic at each storage station.

FIG. 16 shows another embodiment of the invention in which hard-wired logic is used to achieve inventory scanning. For simplicity there is shown the strain gage transducer and A/D converter for only one shelf instead of for three as in FIG. 12. Also it is to be understood that the A/D converter comprises an amplifier 28, a voltage to frequency converter 32 and a counter 34. In place of the microcomputer of FIG. 12, the system of FIG. 16 includes a clock 90 which is connected to the counter 34 of the A/D converter so that the latched output of the counter is reset periodically by and according to the frequency of the clock pulses. It also includes a comparator 92 and two registers 94 and 96 connected to receive as inputs the gross weight data output of counter 34. Register 94 has a "clear" terminal connected to clock 90 via a delay 95 so that it will clear each time but shortly after the output of counter 34 is reset. A second input line of comparator 92 is connected to receive the output of register 94. comparator 92 has two output lines and is arranged so that an output pulse appears on one output line when its two inputs are the same and an output pulse appears on the other output line when its two inputs are different. The "different" and "same" output lines of comparator 92 are connected to the reset and input terminals respectively of a counter 98. The latter is arranged so as to reset itself and also produces an output pulse each time it receives an input after having a count of ten, i.e. on the eleventh input pulse. The output pulse from counter 98 is applied to the enable terminal of weight register 96, with the result that the latter will not respond to the output of the A/D converter until the latter has produced ten identical weight readings in succession. Register 96 is reset each time it is enabled, so that it always contains the latest valid gross weight. Except for the further inclusion of a shelf address register 100 to replace the memory 68, the remainder of the system of FIG. 16 is the same as that of FIG. 12 and operates in the same way. When the address sent out on bus 53 and identified in decoder 72 is the same as the unique address in register 100, comparator 70 will produce an output which together with the Address Valid signal will cause AND gate 74 to enable buffer 76 and also after passing through delay 79, will serve as the Data Valid signal.

Until it is again enabled by an output signal from counter 98, weight register 96 will hold whatever gross weight reading is received from the A/D converter the previous time it was enabled. Thus, when buffer 76 is enabled, it will apply gross weight data to bus 53 for transmittal back to computer 57 only if ten consecutive readings of the output of counter 34 have been identical, i.e., only if a predetermined uniformity is achieved.

Figure 17:
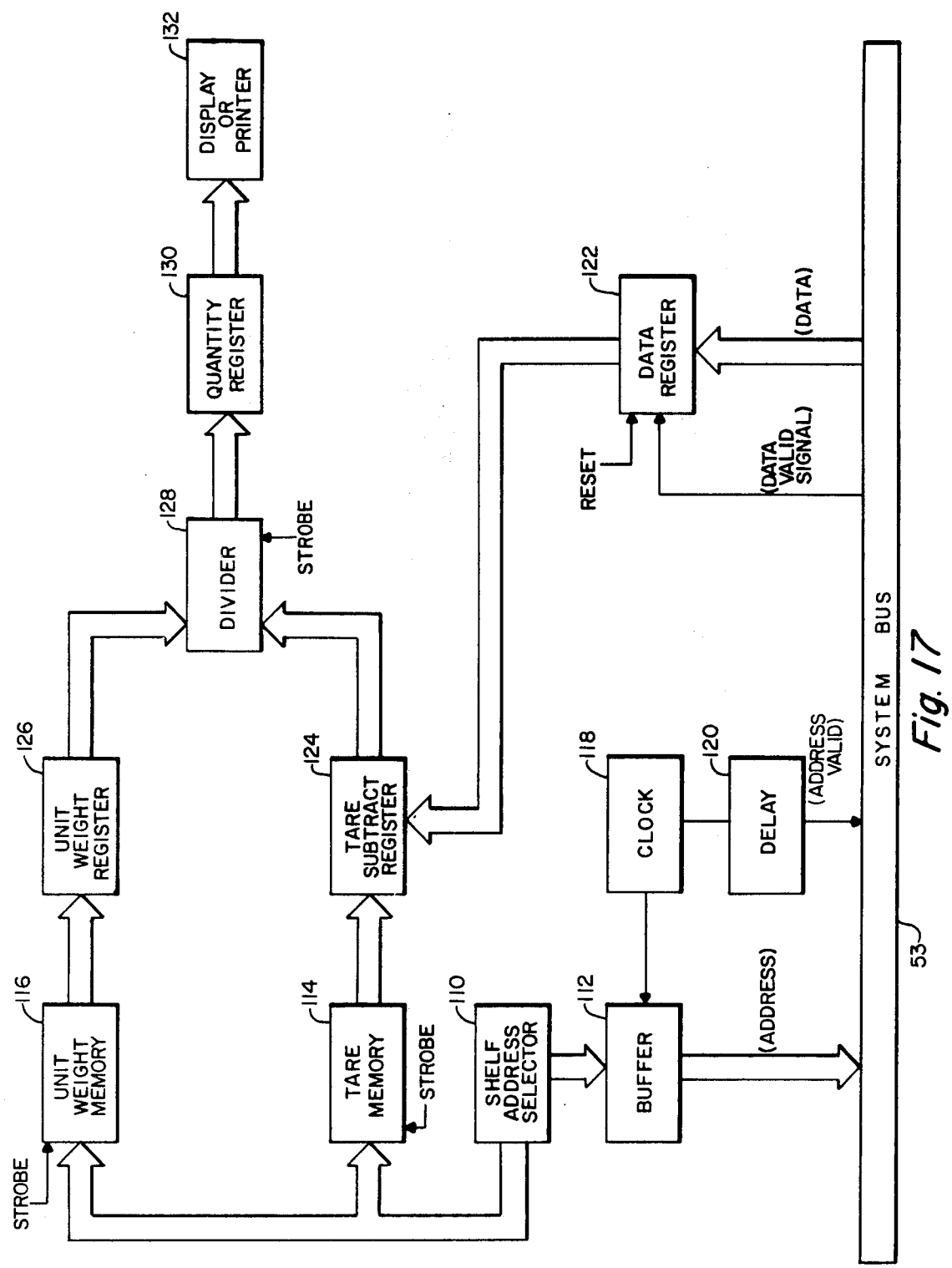
FIG. 17 illustrates how hard-wired logic may be used in place of the central computer arrangement of FIG. 12.

FIG. 17 illustrates how hard-wired logic may be used in place of central computer 57. In this case a shelf address selector 110 of suitable desigh is provided for generating address codes. By way of example, shelf address selector could be a device having a matrix-type code generator for generating a plurality of address codes and means for automatically scanning the matrix so as to ask different address codes to be generated sequentially at a selected frequency in a random or predetermined order. Also by way of comparison the shelf address selector could be a plurality of switches (one switch for each bit of the address code). The shelf address switches could be manually operable, e.g., toggle switches, or they could be electrically or mechanically operable switches, e.g., keyboard operable switches as in a calculator or a keyboard-controlled CRT terminal. Although not shown, it is to be understood that the shelf address selector includes a power supply for generating the address code signals. The parallel bit output lines of shelf address selector 110 are connected via a buffer 112 to bus 53 and also to a Tare memory 114 and a unit of weight memory 116. Buffer 112 comprises a plurality of gated amplifiers connected in parallel between address selector 110 and bus 53. A clock 118 is connected so as to gate buffer 112. The clock output also is passed to a delay 120 and this delayed clock output serves as the Address Valid signal. The system of FIG. 17 also includes a gross weight data register 122, a tare subtract register 124, a unit weight register 126, a divider 128, a quantity register 130 and a display or printer unit 132. The output of clock 118 also is used to strobe the TARE memory 114 and unit weight memory 116 and reset gross weight data register 122. The Data Valid signal from AND gate 74 and delay 79 is applied to the enable terminal of data register 122.

The sub-system of FIG. 10 may be used with the shelf-subsystems of FIGS. 12 or 16.

Each address determined by shelf address selector 110 is gated by buffer 112 to bus 53. The Address Valid signal also is applied to bus 53 with timing like that shown in FIG. 13. The signal from clock 118 strobes memories 114 and 116 so as to enable the latter to respond to the shelf address from selector 110. According to whatever shelf address they received, memories 114 and 116 will transfer the corresponding tare and unit weight values to registers 124 and 126. The gross weight data for the shelf corresponding to the address transmitted by bus 53 is coupled to bus 53 together with the corresponding Data Valid signal from delay 79. This data is applied to register 122, which in turn transmits it to tare subtract register 124 where the tare value received from memory 114 104 is subtracted from the gross weight value to provide a net weight value. Subsequently divider 128 is strobed by the Data Valid signal (delayed according to the response time of registers 122 and 124) whereby the divider operates so that the net weight value is divided by the unit weight value to give a quantity value which is indicative of the number of units on the shelf. This quantity value is stored in quantity register 130, from which the quantity may be retrieved and sent to a suitable display or printer unit 132 or to a remote computer.

It is to be appreciated that the invention as above described is subject to a number of possible modifications obvious to persons skilled in the art. Thus, for example, the shelf supports 6 may take various forms and may also be adjustable so as to permit the individual shelves to be located at variable heights. Also as noted above, the article supporting platforms could be in the form of floors supported in a manner similar to the shelves 2. As a further alternative, the article supporting platforms could be a form of skid mounted on a floor by means of beams 8 or piston units 17 or equivalent. Further, while the invention is described with the understanding that the articles rest on the shelves or other form or platforms, it is to be appreciated that the shelves could be provided with hook means for suspending articles directly or by means of a tether. The number of shelves or article supporting platforms is variable and FIG. 11 is not to be construed in a limiting sense with respect to the number of shelves that may be coupled to the system bus.

A further possible modification related to the embodiment shown in FIG. 10 is to provide a frame member which is attached at its opposite ends to two crossmembers 31 so as to provide additional structural support for the four posts 4, and to mount circuit board 30 on that frame member.

Still other changes may be made in the electrical system. Thus, for example, the address and weight data signals may be transmitted in a serial rather than a parallel format. Also the number of identical converter readings required to be obtained in immediate succession in order to have satisfactory uniformity may vary according to the accuracy and sensitivity of system components and/or the nature of the stocking facility in which it is installed, or can be accomplished by the central computer. It is to be appreciated further that the system may be modified so that the central computer 52 provides an alarm in the event that a change in the number of articles on any shelf occurs during a predetermined time period, e.g., from midnight to six a.m. or at some other time when a facility is normally shut down.

Additionally the piston units 17 supporting the shelves 2 could take various forms. Thus, for example, the piston units 17 could be of the type employing a rolling diaphragm in engagement with a piston head. Also a different number of piston units may be used to support the shelves, but for practical purposes at least three are required.

Various types of strain gages and pressure and force transducers known to persons skilled in the art may be used in practicing this invention (see, for example, H. N. Norton, Handbook of Transducers for Electronic Measuring Systems, pp. 255-292, 415-508 and 557-576, Prentice-Hall, Inc., 1969. Thus, each piston unit and its associated pressure transducer 25 could be replaced by a force transducer of the type that produces an output signal varying with the force exerted by an applied load.

A plurality of shelves arranged as shown in FIGS. 5, 8 and/or 10 may be substituted for or combined with shelves as shown in FIGS. 1-3 in the systems illustrated in FIGS. 11-17.

Still other changes will be obvious to persons skilled in the art.

What is claimed is:

1. A physical inventory scanning and recording system comprising:
   a plurality of storage stations each comprising (a) at least one platform for carrying articles and (b) support means supporting said platform at a plurality of mutually spaced locations;
   said support means comprising a transducer adapted to generate an analog output gross weight signal varying in accordance with changes in the load on said support means presented by said platform and the articles carried by said platform;
   voltage-to-frequency converter means responsive to the gross weight signals generated at said stations for producing digital output signals varying in accordance with said gross weight signals;
   a computer adapted to store said digital signals and to provide signals representative of the number of articles carried by said platforms in accordance with the load values represented by said said digital output signals; and
   scanning means for reading said digital output signals and applying said output signals to said computer.

2. A system according to claim 1 wherein said support means comprises a plurality of fluidic support units supporting each platform and pressure transducer means coupled to said fluidic support units for (a) sensing changes in the pressure in said fluidic support units resulting from changes in the total weight of the platform and articles supported on said platform and (b) producing a gross weight signal which varies in response to the changes in pressure.

3. A system according to claim 1 wherein said computer comprises means responsive to said digital output signals for determining the number of articles on each platform, and further including a specific address for each of said storage stations, and further wherein said scanning means includes computer-controlled means for selectively addressing each of said storage stations.

4. A physical inventory and scanning system according to claim 1 wherein said computer is adapted to correct said digital output signals for nonlinearity in said gross weight analog signals.

5. A system according to claim 1 wherein said scanning means comprising a plurality of microcomputers and bidirectional means connecting said microcomputers to said computer, said microcomputers having means for establishing unique addresses for said platforms and being adapted to transmit said digital output signals to said computer on interrogation by said computer, said computer being adapted to (a) selectively transmit signals identifying said unique addresses to said microcomputers, (b) adjust the digital output signals received from said microcomputers to compensate for platform weight, (c) divide said adjusted digital output signals by the unit weight of the particular articles supported on the corresponding platform so as to determine the quantity of said particular articles on said corresponding platform, (d) establish a record of said quantity, and (e) revise said record in accordance with changes in said digital output signals.

6. A physical inventory and scanning system according to claim 5 wherein said computer is adapted to correct the said digital output signals for nonlinearity in said gross weight analog signals.

7. A system according to claim 6 wherein each platform comprises a shelf and the support means for each shelf comprises two parallel members attached to said shelf so as to undergo a change in stress as the load on the shelf is varied, and the transducer for each support means comprises strain gages on each of said parallel members arranged to undergo compression and tension as the load on the shelf is varied, and means coupling said strain gages together for producing said output gross weight signal.

8. A system according to claim 1 further including means for repetitively measuring said digital output signals to determine the value of a selected parameter of said output signals, and means for preventing generation of said digital output signals until n successive measurements of said gross weight signals reveal no change in said selected parameter, where n is an integer of predetermined value.

9. A system according to claim 8 wherein said means for preventing generation of said output signals comprises:
   comparator means for comparing the value of said selected parameter of said output signals with a predetermined standard and for producing a first comparator output signal each time said selected parameter has the same value as said predetermined standard and a second comparator output signal each time said selected parameter has a value different from said predetermined standard,
   a counter arranged to (a) count each of said first comparator output signals, (b) reset in response to each of said second comparator signals, and (c) reset each time n of said first comparator output signals have been counted; and
   means for preventing generation of said output signals until n successive first comparator signals have been counted by said counter.

10. A physical inventory scanning and recording system comprising:
    a plurality of storage stations each comprising at least one shelf for carrying articles, and support means supporting each shelf at a plurality of mutually spaced locations;
    each of said support means comprising at least two beams and strain gages attached to each beam adapted to produce an analog output gross weight signal varying in accordance with changes in the load on said support means presented by a shelf and the articles carried by said shelf;
    means including voltage-to-frequency converter means responsive to said gross weight signals for producing digital output signals representative of the number of articles carried on the shelves corresponding to said gross weight signals; and
    means for storing said digital output signals for subsequent retrieval and use.

11. A system according to claim 10 wherein said each beam is connected to each shelf at two points.

12. A system according to claim 10 wherein each shelf is supported by four cantilever beams.

13. A system according to claim 12 wherein each beam undergoes bending stress as the load on the shelf increases.

14. A system according to claim 13 wherein said strain gages are coupled together in a bridge circuit.

15. A system according to claim 14 further including means for repetitively measuring said gross weight signals to determine the value of a selected parameter of said gross weight signals, and means for preventing generation of said output signals until n successive measurements of said gross weight signals reveal no change in said selected parameter, where n is an integer of predetermined value.

16. A system according to claim 14 wherein separate beams support each shelf at two opposite ends thereof, and the strain gages attached to said beams are coupled together in a bridge circuit.

17. A physical inventory scanning and recording system comprising:
a plurality of storage stations each comprising at least one platform for carrying articles, and support means supporting each platform at a plurality of mutually spaced locations;
a specific address for each storage station;
each of said support means comprising a transducer adapted to produce an analog output gross weight signal varying in accordance with changes in the load on said support means presented by said platform and the articles carried by said platform;
means response to said gross weight signals for producing output signals representative of the number of articles carried on the platforms corresponding to said gross weight signals;
output signal processing means for processing the output signals from each of said storage stations; and
scanning means for selectively coupling said output signals to said processing means, said scanning means including means for selectively addressing each of said storage stations, and means for coupling the output of the transducer means of a particular storage station to said signal processing means whenever said each storage station is correctly addressed.

18. A system according to claim 17 wherein said means for producing output signals comprises an analog-to-digital converter connected to each transducer, and further wherein said scanning means comprises a microcomputer at each storage station, a central computer, and bidirectional data-transmitting means interconnecting said central computer with each of said microcomputers, each analog-to-digital converter being connected to the corresponding transducer and being adapted to produce a digital output representative of said total weight in response to the gross weight analog signal of said corresponding transducer, each microcomputer including means for establishing a unique address for each platform of the corresponding storage station and being adapted to transmit the said digital output of the corresponding converter to said central computer when signals identifying said unique address are transmitted to said each microcomputer from said central computer, and said central computer being adapted to (a) selectively transmit signals identifying said unique addresses to each of said microcomputers, (b) adjust the digital output received from each microcomputer to compensate for platform weight, (c) divide said adjusted digital output by the unit weight of the particular articles supported on the corresponding platform so as to determine the quantity of said particular articles on said corresponding platform, (d) establish a record of said quantity, and (e) revise said record in accordance with changes in said digital output.

19. A physical inventory and scanning system according to claim 18 wherein said central computer is adapted to correct the digital output from each microcomputer for nonlinearity in said gross weight analog signal.

20. A physical inventory scanning and recording system comprising:
a plurality of storage stations each comprising at least one shelf for carrying articles, and support means supporting each platform at a plurality of mutually spaced locations;
each of said support means comprising (a) two parallel members attached to said shelf so as to undergo a change in stress as the load on the shelf is varied, and (b) transducer means adapted to produce an analog output gross weight signal varying in accordance with changes in the load on said support means presented by a shelf and the articles carried by said shelf, said transducer means comprising strain gages on each of said parallel members arranged to undergo compression and tension as the load on the shelf is varied and means coupling said strain gages together for producing said analog output gross weight signal; and
means responsive to said gross weight signals for producing output signals representative of the number of articles carried on the platforms corresponding to said gross weight signals.

21. A system according to claim 20 wherein said members undergo bending stress as the load on the shelf increases.

22. A system according to claim 20 wherein said members undergo torsional stress as the load on the shelf increases.

23. A system according to claim 20 wherein for each shelf the strain gages are coupled together in a bridge circuit.

24. A physical inventory scanning and recording system comprising:
a plurality of storage stations each comprising at least one platform for carrying articles, and support means supporting each platform at a plurality of mutually spaced locations;
each of said support means comprising a transducer adapted to produce an analog output gross weight signal varying in accordance with changes in the load on said support means presented by said platform and the articles carried by said platform;
means responsive to said gross weight signals for producing output signals representative of the number of articles carried on the platforms corresponding to said gross weight signals;
means for repetitively measuring said gross weight signals to determine the value of a selected parameter of said gross weight signals; and
means for preventing generation of said output signals until n successive measurements of said gross weight signals reveal no change in said selected parameter, where n is an integer of predetermined value.

25. A system according to claim 24 wherein said means for preventing generation of said output signals comprises:
comparator means for comparing the value of said selected parameter of said gross weight signals with a predetermined standard and for producing a first comparator output signal each time said selected parameter has the same value as said predetermined standard and a second comparator output signal each time said selected parameter has a value different from said predetermined standard,
counter arranged to (a) count each of said first comparator output signals, (b) reset in response to each of said second comparator signals, and (c) reset each time n of said first comparator output signals have been counted; and means for preventing generation of said output signals until n successive first comparator signals have been counted by said counter.

26. A physical inventory scanning and recording system comprising:

a plurality of storage stations each comprising a platform for carrying articles and support means supporting said platform at a plurality of mutually spaced locations;

said support means comprising transducers adapted to produce analog output gross weight signals varying in accordance with changes in the load on said support means presented by the platforms supported by said support means and the articles carried by said supported platforms;

voltage-to-frequency converter means responsive to said gross weight signals for producing digital output signals which vary in accordance with said gross weight signals; and computer means adapted to store said digital output signals for subsequent processing to provide a determination of the number of articles carried on said platforms.

* * * * *

UNITED STATES PATENT AND TRADEMARK OFFICE
CERTIFICATE OF CORRECTION

PATENT NO. : 4419734

DATED : December 6, 1983

INVENTOR(S) : William Wolfson et al

It is certified that error appears in the above-identified patent and that said Letters Patent is hereby corrected as shown below:

Claim 1, column 17, line 19, delete the word "said" (second occurrence).

Claim 5, column 17, line 44, "comprising" should be -- comprises --.

Claim 17, column 19, line 19, "response" should be -- responsive --.

Signed and Sealed this

Third Day of April 1984

[SEAL]

Attest:

GERALD J. MOSSINGHOFF

Attesting Officer

Commissioner of Patents and Trademarks